United States Patent [19]

Ray et al.

[11] Patent Number: 4,611,099

[45] Date of Patent: Sep. 9, 1986

[54] CABLE ANALYZER WITH D. C. FUNCTIONS

[75] Inventors: Jimmy C. Ray; H. Wayne Mathews, both of Denison, Tex.

[73] Assignee: Industrial Innovations, Inc., Denison, Tex.

[21] Appl. No.: 666,836

[22] Filed: Oct. 31, 1984

[51] Int. Cl.$^4$ ............................................. H04B 3/46
[52] U.S. Cl. ............................. 179/175; 179/175.3 R
[58] Field of Search ................. 179/175.2 C, 175.3 R, 179/175, 175.3 F; 324/51, 60 C, 62; 364/483

[56] References Cited

U.S. PATENT DOCUMENTS 3,814,869  6/1974  De Luca ...................... 179/175.3 R
4,186,283  1/1980  Simmonds ................... 179/175.3 R
4,496,801  1/1985  Roberts et al. ............. 179/175.3 R

OTHER PUBLICATIONS

Operating Practices, Throwmaster Cable Test Set Mod. 106-25, Industrial Technology, Inc., pp. 1-17, 1982.

*Primary Examiner*—Stafford D. Schreyer
*Attorney, Agent, or Firm*—Wendell Coffee

[57] ABSTRACT

A cable analyzer is capable of having a group of 25 pairs of wire from a telephone cable connected by a module to the analyzer. By a central processing unit or computer in the analyzer, a series of relays connect any one of the pair of wires to a routing board. At the routing board, a plurality of analog tests may be directed to be conducted upon the pair of wires and ground, or the wires may be routed within the analyzer for other purposes. The results of the analog tests are converted to binary digital format so that they may be analyzed by the central processing unit. The results are visually displayed or printed. The central processing unit has the capabilities, through different programs, to conduct a plurality of tests upon each pair, and upon the completion of the plurality of tests, proceed to a subsequent pair for a plurality of tests. Furthermore, the central processing unit has means whereby the results of tests may be transmitted on standard RS232C; or the analyzer may be controlled from a remote location by RS232C transmission to the analyzer.

19 Claims, 5 Drawing Figures

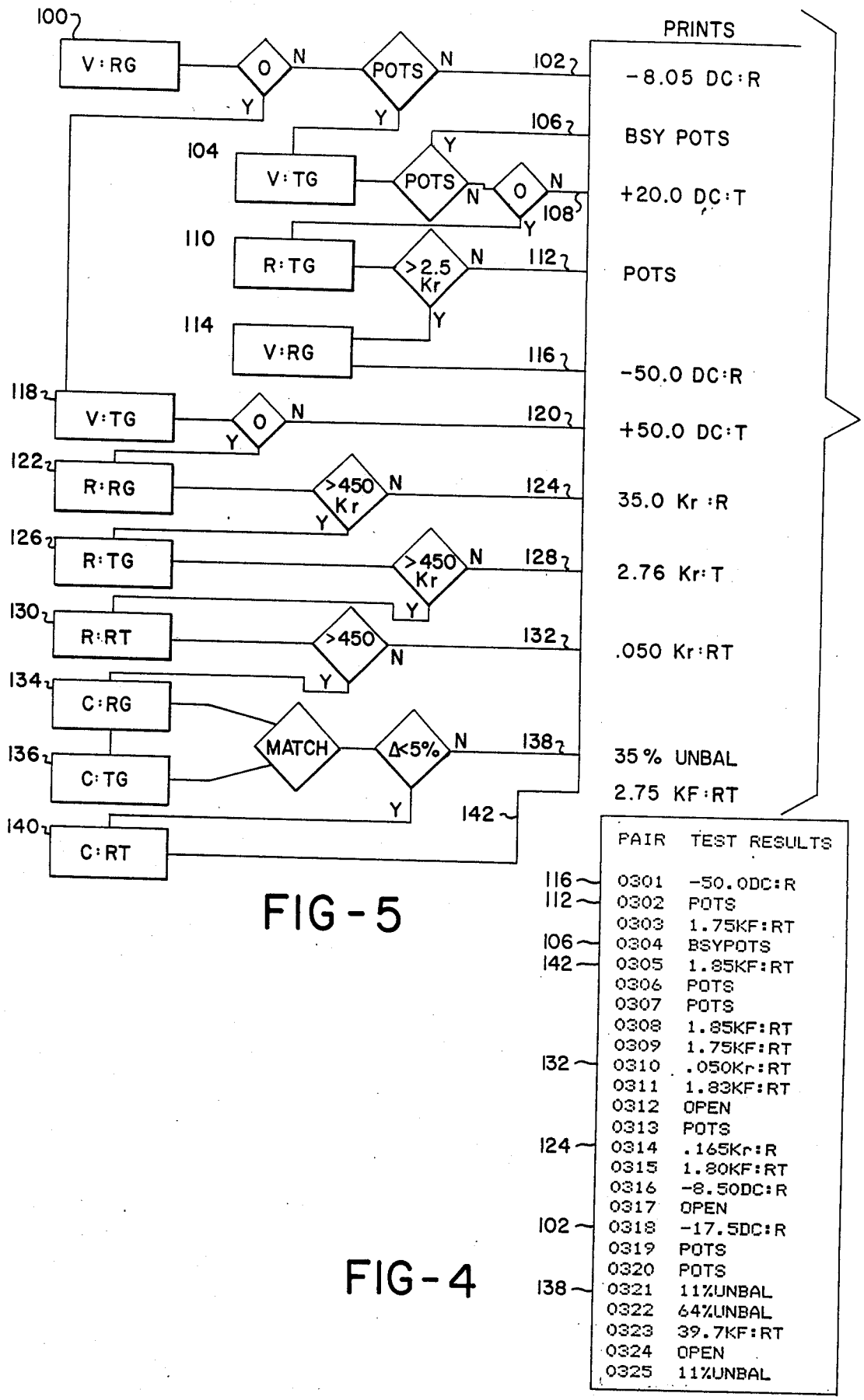

CABLE ANALYZER WITH D. C. FUNCTIONS

BACKGROUND OF THE INVENTION (1). Field of the Invention

This invention pertains to computer design. Applicant designates a computer designer as one having ordinary skill in the art. Therefore, this application is written so that a computer designer would be able to make and use the invention. In this regard, an operating manual is submitted herewith as an appendix to this application explaining operation of the apparatus.

This invention is to be used with telephone communications, cables; and particularly to aid in identification and analysis of status and condition of the pairs of wire in a telephone cable.

(2) Description of the Prior Art

The normal telephone system includes a central office where the telephone switching occurs, and from the central office extend many cables, each having many pairs of wire. These pairs of wire will extend to another central office or into the field to individual telephones. Before this invention, it had been common practice in the telephone systems to inspect the different pairs of wire in a telephone cable in the field.

Between the central office and the phone there are numerous junction boxes or the like. Before this invention, it was known that a certain analysis could be made at these junction boxes or any point the wire pairs of the cable were accessible.

The two wires of a pair are designated in the phone system as the ring and tip. One wire being the ring and one wire being the tip of each pair. It was known that various tests could be made; e.g., the voltage determined between the ring and tip, the ring and ground, and tip and ground. Also, in the absence of voltage, the resistance from ring to tip, ring to ground, and tip to ground could be determined. It was known that if these measurements were of certain value, it could be determined whether the pair was a "plain old telephone service" (herein called POTS) and also from this whether the pair was an idle or a busy POTS.

Typically in the standard telephone system used in the United States, the POTS will have a voltage from ring to ground of about −50 volts, + or −5 volts, and the tip will have a low resistance from tip to ground. I.e., it will have a typical tip to ground resistance of 1,000 ohms, when idle. When busy, the tip to ground will have a voltage of approximately −15 volts, + or −9 volts.

Furthermore, equipment existed before this invention to measure the capacitance. The capacitance between the ring and tip could be measured. The standard wire in common use would have a certain capacitance of per thousand feet. Therefore, by measuring the capacitance between ring and tip, a measurement could be obtained of the total length of wire. If the capacitance from ring to ground did not equal the capacitance from tip to ground, this difference indicated that the pair was unbalanced.

Furthermore, it was known, because of certain external conditions, the voltage of the wires would vary on an instantaneous basis. Therefore, for accuracy, no reading should be instantaneous, but the average of multiple readings. Of course with structural devices, such as a volt meter having a needle indicating the volts, the inertia of the physical parts act as to average the reading inasmuch as the change in voltage would be so rapid that the needle could not physically move, but because of inertia, would average the instantaneous values.

SUMMARY OF THE INVENTION (1) New Functions and Surprising Results

This invention uses a cable analyzer which is unique in several respects. First, the analyzer has two 25 pair plug connectors or jacks or modules.

Each plug connector has 50 pin connections whereby 25 pairs of wire can be connected at one time. The preferred module plug is known in the trade as "Cinch Jones", (a trademark). The pairs are in a fixed pattern on the "Cinch Jones" and thus, on the plug connector. E.g., pair 7 will always be at the same place on the "Cinch Jones" and will always be the same two pins on the pin connector of the analyzer. The analyzer is computerized so that a series of tests may be conducted. I.e., the panel has a 16 key input board. By keying two keys, a particular program may be used which, for example, would conduct a pretest. Results of the test can be visually displayed and printed so that the analysis of each of the pair of wires within the 25 pair would be recorded.

As stated above, there are two of the modular or plug connectors. One is identified as an old connection for an old cable, and the other is identified as a new connection, so named to be connected to a new cable. In such a test, parameters of one of the pairs of wire on the old module or old cable can be compared to the parameters of the pairs upon the new module. If the parameters match between the old and new, a tone can be placed upon the pair in the old connector to see if the same tone is received on the pair in the new connector, and therefore, identity or connection between the old and the new pairs can be established.

The different tests as performed by the analyzer (such as voltage, resistance, and capacitance) are all conducted as analog tests, and therefore, it is necessary to translate or change the analog information into binary digital form. Central processing unit, (called CPU herein) besides having the programs on "programmable read only memory" units (called PROM); also has memory units as "random access memory" (called RAM).

In addition to having the RAMS, PROMS and integrated circuit, the CPU will also have a clock. In addition to the computer control, the clock will also generate a 612 KHz signal and a 4.8 KHz signal which will be transmitted to various components of the analyzer such as a converter, where the analog to digital conversion takes place as well as other functions.

As a result of these capabilities, the analyzer can make and perform numerous tasks and print out the results or the conclusion of these many tasks in written form in much shorter time than they could be performed otherwise.

Further, the analyzer has bridging relays so that a pair from the old connector can be connected to a pair in the new connector. Alternatively, all 25 pairs from the old connector can be connected to all 25 pairs of the the new connector.

In addition, the central processing unit translates its output into RS232C mode or language and is programmed to receive commands in RS232C mode. Therefore, the output of the analyzer, which is normally made available at the analyzer, can be transmitted to a remote location and either displayed at a remote location or printed at a remote location. Likewise, the control of the unit which is normally controlled from the front panel of the unit, can be controlled by the RS232C input code from a remote location.

In addition, according to this invention, the analyzer itself, is only 22" (55.88 cm) wide by 8" (20.32 cm) high and 10.5" (26.67 cm) deep. The entire unit weighs only 28 pounds (12.7 Kg.) including the rechargeable battery power supply.

(2) Objects of this Invention

An object of this invention is to analyze the wire pairs in a telephone cable.

Another object is to analyze and manipulate the wire pairs in two telephone cables and the interaction of the pairs in one cable with the other cable.

Further objects are to achieve the above with a device that is sturdy, compact, durable, lightweight, simple, safe, efficient, versatile, ecologically compatible, energy conserving, and reliable, yet inexpensive and easy to manufacture, connect, adjust, operate and maintain.

Other objects are to achieve the above with a method that is versatile, ecologically compatible, energy conserving, rapid, efficient, and inexpensive, and does not require highly skilled people to connect, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 4 illustrates an example of the tape printed from the pretest program.

FIG. 5 is a representation of the steps taken in a pretest program.

DESCRIPTION OF THE PREFERRED EMBODIMENT

Figure 1:
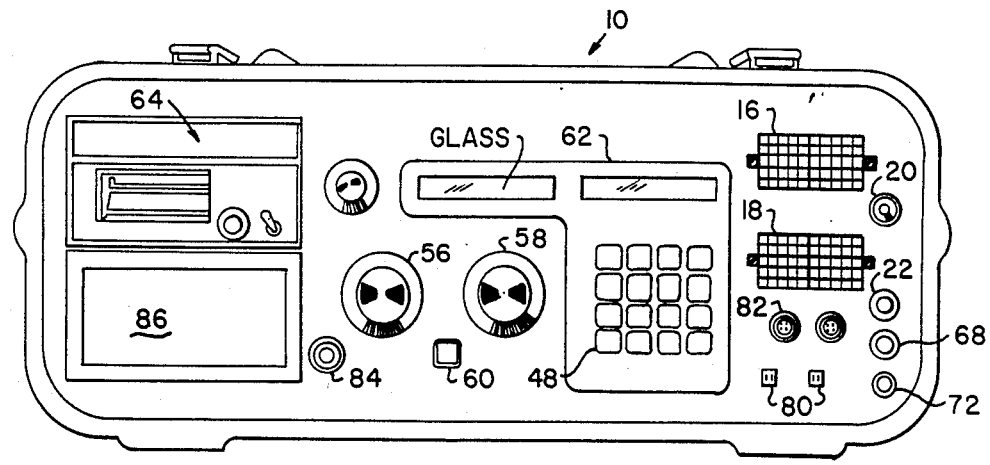
FIG. 1 is a front elevational view of the front panel of the cable analyzer.
Figure 2:
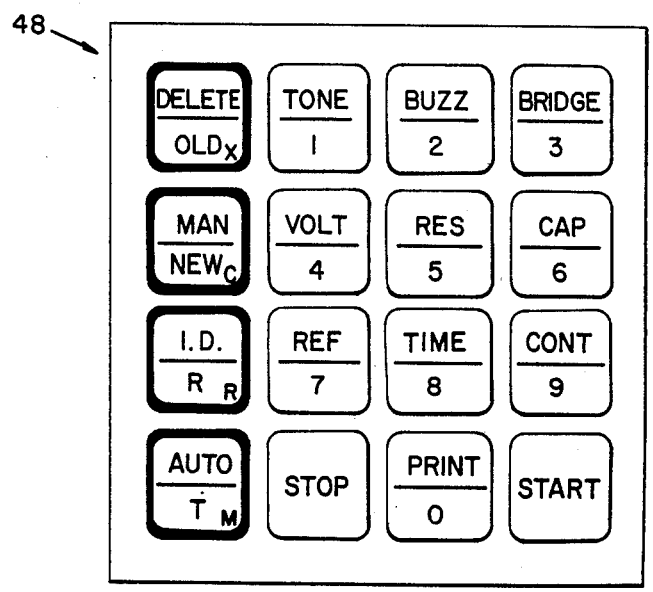
FIG. 2 is a front elevational view of the 16 key pad.

Referring to the drawings, and more particularly to FIGS. 1 and 2, there may be seen cable analyzer 10. The analyzer will include batteries 12 which may be recharged by plug in wall transformer 14 through power supply 15. The analyzer will have a 25 pair plug connector which is designated as the old module or old plug connector 16. As mentioned before, it generally bears the designation of "Cinch Jones". There is also a 25 pair connector designated as the new plug connector 18 which again is a 50 pin connector. In addition to the 25 pair connectors, there is a single jack or old receptacle 20 to connect a single pair as well as a single pair new receptacle 22.

The pins of the old connector 16 are connected by hard-wiring or old ribbon 24 to an old pair selector board 26. Likewise, new connector 18 is connected by a new hardwire ribbon 28 to the new pair selector board 30. Each pair selector board has 26 double pole relays. By these relays, any one of the pairs in either the old connector 16 and old receptacle 20 may be connected to routing board 32. The connection of one of the pairs from the old connector or old receptacle to the routing board is by old buss 34, as shown. Likewise, the connection between the relays of the new pair selector and the routing board is by the new buss 36.

Bridge board 38 connects both to the old pair selector 26 and the new pair selector 30. It has 26 double pole double throw relays. By the bridge board 38, any pair from the old connector 16 can be connected or bridged to the corresponding pair of the new connector 18.

Central processing unit 40 (called CPU herein) controls the pair selection and routing, and basically all other functions of the analyzer. Besides the basic integration circuit, the CPU will include a plurality of PROM units which will contain the programs for the analyzer. It will also contain several RAM units. Also, a clock in the CPU produces 612 KHz and 4.8 KHz signals for the various components. The CPU 40 is connected by both data buss 42 and port buss 44 to the old pair selector 26, the new pair selector 30, the bridge board 38 and the routing board 32. It is by operation of the CPU 40 that a particular pair is selected to be connected by relay to the routing board. The CPU signals the particular test to be performed upon them. Also, it is the signal from the CPU 40 that directs the individual relays in the bridging board 38 to bridge one of the pairs from the old connector 16 to the corresponding pair on the new connector 18.

The routing board 32 is connected by a plurality of connectors to analog to binary digital converter 46. The converter 46 does more than merely convert, it processes the analog signal. For example, normally the first test which is made upon a pair as determined by the CPU 40 is to measure, by volt meter 43, the voltage from ring to ground, tip to ground, and ring to tip. Therefore, after the CPU has directed the converter 46 to make the voltage readings these voltage readings are stored in the RAMS of the CPU 40. Then the voltages are analyzed by the CPU and compared to certain standards as contained in the PROMS. Likewise, ohmmeter 45 of the converter 46 would, upon proper command or direction from the CPU 40, determine the resistance of a designated pair between ring and ground, tip and ground, and ring to tip, convert this information to binary digital code to be transmitted to the CPU for storage and analysis. Likewise, capacitance meter 47 would make capacitance tests, ring to ground, tip to ground, and ring to tip, to be converted to binary digital code, analyzed and stored.

The routing board 32 does more than merely route a pair (for example, pair number 7 as it might be designated inasmuch as the pairs in each group are designated from pair 1 through pair 25, ordinarily). The routing board, besides picking out one particular pair, would also route it to the particular meter, either the ohmmeter 45, volt meter 43, or capacitance meter 47 as directed. Also, it would indicate in its routing whether the measurement was to be ring to tip, ring to ground, or tip to ground.

The main input by the operator to the CPU 40 is by sixteen membrane key pad 48. The key pad is connected to display driver 50, and from there, by 40 pin ribbon 52 to front panel control 54. The front panel control is connected by the data buss 42 and port buss 44 to the CPU. Front panel control 54 is also connected to the CPU by a plurality of hard wires for standby power and reset and low battery.

In addition to the 16 key pad 48, there is an old pair selector switch dial 56 and a new pair selector switch dial 58. By these dials, manually, any pair on the old connector 16 or receptacle 20 or any pair on the new connector 18 or receptacle 22 may be manually selected for tests.

In addition, on the front panel there is a reset membrane switch 60 which is connected through the display driver 50 and front panel control 54 and hardwire 55 to the CPU 40.

The display driver 50 is also connected to visual display board 62 which is in the form of a dual or two panel eight character liquid crystal diode alphameric.

Thermal printer 64 is connected directly to the CPU 40 and also to generator 66. The generator has the capabilities of generating dual tone multiple frequency (called DTMF dial tones herein).

Also, according to the known usage, the tone can be sent in a simplex mode so it is inaudible to someone using a telephone upon the line, but still can be distinguished by probe plugged in probe receptacle 68. Probe receptacle 68 is connected to amplifier circuit 70 which is also connected to the generator 66. Amplifier circuit 70 also has switching capabilities and is connected to the old receptacle 20 and the new receptacle 22.

Ground lug 49 is connected directly to routing board 32.

On/off switch 74 is combined with volume control 76. The volume control 76 is connected to the generator 66. The on/off switch 74 is connected to the power supply and charger 15 which interconnects the battery pack 12 and the wall transformer 14. The wall transformer 14 for the batteries 12 is connected to the battery charge receptacle 84. The power supply 15 is connected to the different elements of the analyzer 10 requiring power.

Talk lugs 80, upon the front panel, are connected to the generator 66. In addition, there is a four prong talk and data receptacle 82. Both the head set for the talking and the data connectors are connected to the generator 66. Cord storage pocket 86 is within the front panel of the analyzer 10. TCX receptacle 88 on the front panel is connected to the amplifier circuit 70.

Example of Function

To give an example of certain functions of the system, a pretest program will be described. The pretest is to obtain information about the D.C. voltage, resistance and capacities of the wires and pairs within a 25 pair group in the cable. The pretest is useful prior to a cable transfer so that working, faulty, or vacant pairs are readily identified.

Figure 3:
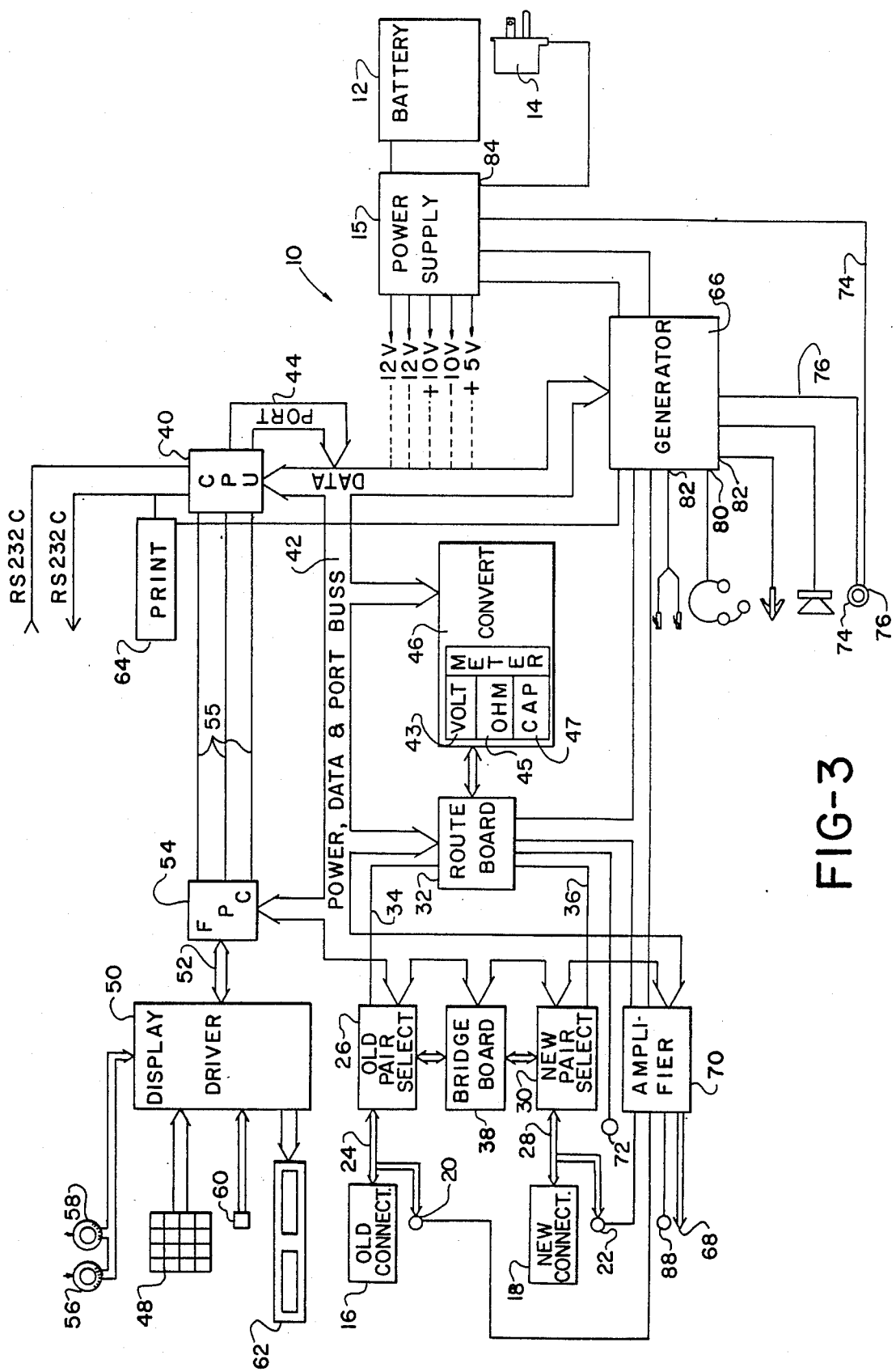
FIG. 3 is a schematic representation of the operation of the cable analyzer.

To perform a pretest, a group of wires terminating in a modular connection is connected to the old connector plug 16. The analyzer 10 is grounded, preferably to the cable sheath. Then, with the set on, the operator presses the key pad marked "AUTO" as seen in FIG. 3 and then presses the key pad marked "1" as seen in FIG. 3. Then, the operator would press the key pad marked "PRINT". The pressing of the key pads "AUTO, 1" would bring up on the CPU the proper program which is stored in the PROMS to conduct the automatic pretest program. Pressing the key pad "PRINT" would command the CPU to print the results of the test.

As the first function of the "AUTO, 1, PRINT" program, the CPU would cause to be displayed upon the old portion of the visual display board 62 "CABLE 00". The operator could key the numbers "03" indicating that the test was being made on cable 03. Then, the CPU would store this information on one of the RAMS. Then, the operator would press "START". Then, the new display of the visual display board 62 would read "CABLE 00". There being no new cable, the operator would press "START" again. The CPU would cause the old display to read "CNT 0000". The operator would enter the count, e.g., "01". The operator would then press "START" again. The new display would read "CNT 0000" since there was no new cable plugged into the new pair selector board 30, the operator would press "START" again.

The steps hereafter are represented in FIG. 5 and identified by numerals.

With this "START", the CPU would direct the old pair selection board 26 to connect the first pair as identified on the "Cinch Jones" connector 16 to the routing board 32. The CPU 40 would direct the routing board to connect the ring and ground to the volt meter 43. The CPU would direct the converter 46 to make multiple instantaneous readings (step 100) of the voltage from ring to ground and take the average of these voltages. The reading from the volt meter 43 would first be an analog signal related to a selected pair. The analog signal will be converted to a binary digital signal for use by the CPU. The CPU would determine if the voltage were zero. If the voltage were zero, a further test would be made, but if the voltage were not zero, then it would be determined if the voltage were within the POTS parameter (that is about −50 volts). If it were, the CPU would put this information in memory and proceed to check further for POTS parameter. On the other hand, if the voltage were present ring to ground, but this voltage did not match the parameters of a POTS, it would print (step 102) the voltage of the ring to ground and proceed to the next pair. Anytime the result is printed by the printer, then the test would proceed to the next pair.

Next, the CPU 40 would instruct the routing board 32 to connect the tip and ground to the volt meter 43, and the converter 46 to check the voltage tip to ground (step 104). There would be multiple voltage tests and the average taken by the CPU 40. The CPU would determine if the voltage were in "busy POTS" parameter. If the voltage between tip to ground were in the busy POTS parameters (that is about −14 volts) it would then identify the pair as a busy POTS, print the pair number on the tape with the identification of "busy POTS" and proceed to the next pair (step 106). The CPU would determine if the voltage were zero. If the voltage, tip to ground, were not zero, this voltage would be printed (step 108). If the voltage between the tip and ground were zero (0), then the CPU would instruct the converter to measure the resistance between tip and ground (step 110). The CPU would determine if the resistance was greater than 2.5 K ohms. If the resistance were in the parameters of an idle POTS, i.e., less than about 2,500 ohms, the CPU would identify the pair as an idle POTS and cause the printer to print the line number and "POTS" and then proceed to the next pair (step 112).

If the tip to ground resistance were greater than about 2.5 K ohms, then the CPU would command the routing board to again check the voltage ring to ground (step 114). Then, this voltage would be printed (step 116) and the CPU would go on to the next pair.

If there were no voltage on ring to ground, the CPU 40 would instruct the routing board 32 to connect tip and ground to the converter 46 and voltage would be checked between tip and ground (step 118). If the voltage between tip and ground were not zero, this voltage would be printed (step 120).

If there were no voltage, either ring to ground or tip to ground, then the resistance would be measured between ring to ground (step 122). The reading of the ohmmeter 45 will be an analog signal related to a selected pair. The analog signal will be converted to a binary digital signal for use by the CPU. If this resistance were below about 450 K ohms, the resistance value would be printed (step 124) and the CPU would go onto the next pair.

If the resistance value were greater than about 450 K ohm, then the CPU 40 would direct the routing board 32 to connect the tip and ground to the ohmmeter 45 and the ohmmeter to measure the resistance of the tip to ground (step 126). Again, if it were below about 450 K ohm, the value would be printed (step 128).

If the resistance were above about 450 K ohms, the CPU would direct the board to connect the ring and tip to the ohmmeter 45 and the resistance read (step 130). If there were resistance to ring and tip below about 450 K ohm, this value would be printed on the tape and the CPU would go onto the next pair (step 132).

If the resistance were above about 450 K ohm, the CPU would direct that the ring and ground be connected to the capacitance meter 47, and the converter 46 to conduct a capacitance test (step 134). The reading from the capacitance meter 47 will be an analog signal related to a selected pair. The analog signal will be converted to a binary digital signal for use by the CPU. This capacitance would be stored in memory, and then the CPU would direct the routing board to connect the tip and ground to the capacitance meter. The CPU would direct the converter to determine the capacity tip to ground (step 136), and then this value would be compared at the CPU 40 to the value of the capacitance ring to ground. If they were not about the same value (the difference less than about 5%), the percent of unbalance between these capacitance values would be printed on the tape, and the CPU would go to the next pair (step 138).

If the capacitance were about the same value, then the CPU would direct the routing board to connect the ring and tip to the capacitance meter 47, and the capacitance determined between ring and tip (step 140). This value would be converted at the CPU into an equivalency of thousands of feet and this value printed on the tape, and the CPU would go to the next pair (step 142).

Referring to FIG. 4, pair 1 shows that there was −50 volts between ring and ground. However, the assumption is that the tip parameters were not that of POTS. The −50 volts ring to ground indicates certain special circuits.

Pair 2, 6, 7, 13, 19, and 20 shows POTS. Pair 4 shows a busy POTS.

Pair 3 and several of the others show a length in 1,000 feet (KF.) between the ring and tip (RT.). Therefore, the analyzer shows that the length of the pair 3 line is 1,750 feet. Also, this means that there are no voltages and all resistances are greater than 450,000 ohms.

Pair 10 shows that there is a resistance ring to tip of 50 ohms (K=1,000; r=resistance in ohms). This indicates that there is a short between the ring and tip. With the knowledge of the gauge of wire being used, the distance to the fault could be calculated.

Pair 12, 17, and 24 indicate open line. This means there are no voltages and all resistances are greater than 450,000 ohms. This means that the capacitance meter indicated the length of the line was very short, meaning that probably the pair to be open within a few feet of the test set.

Pair 16 and 18 show a rather low voltage ring to ground. This probably indicates some special circuits such as an alarm system upon the line.

Pair 21, 22, and 25 show an unbalance of 11%, 64%, and 11% respectively. This indicates that the line is vacant, no voltage, high resistance, but with some problem on the line to cause the capacitance of the ring and tip to be different or that there is possibly a special circuit with no battery on the pair.

Those with ordinary skill in the art will understand that a group could be connected into the new pair connector 18 and a test made from there. Also, groups of 25 pair each could be connected both to the old and new and after the old 25 pair were tested, then the new 25 pair could be tested. Furthermore, instead of printing the results that the results of the the tests of each pair could be visually displayed, however, for automatic testing this would be perhaps too rapid to be checked, and therefore it would be better that this being done manually. Manual testing could be done whereby the operator would press the "MANUAL" pad and then manually select the pair by the dial indicators 56 and 58 on the front panel. The operator would press "START" for each pair which would then display the results as indicated above upon the visual display board. Also, it would be understood by one with ordinary skill in the art that instead of making the entire pretest that at any time desired that any one value such as voltage, resistance or capacitance could be read upon any individual pair.

Furthermore, it would be understood that by use of the capabilities of the unit that results could be transmitted to a remote location. The analyzer could be controlled by a remote location.

Also, actually, the example of the measuring the voltage would be as indicated above that there would be a repeated measurement of the instantaneous voltage by the volt meter 43 in the converter 46. Then each of the values would be converted to binary digital form to be put to the CPU where the several values would be stored in memory. Then, upon the completion of the multiple tests, they would be averaged. Likewise, multiple resistance readings would be taken, converted to binary digital mode, sent to the CPU, stored in memory, then called up to be averaged and used. The same is also true for the capacitance test. Multiple instantaneous readings are made, converted, stored, and averaged.

The embodiment shown and described above is only exemplary. We do not claim to have invented all the parts, elements or steps described. Various modifications can be made in the construction, material, arrangement, and operation, and still be within the scope of our invention.

The limits of the invention and the bounds of the patent protection are measured by and defined in the following claims. The restrictive description and drawing of the specific examples above do not point out what an infringement of this patent would be, but are to enable a person with ordinary skill in the art to make and use the invention.

In this regard, Applicant recognizes that certain program steps have not been included. E.g., Applicant has not described the resetting or erasing of entries into the RAMS at the point they are no longer needed.

As an aid to correlating the terms of the claims to the exemplary drawing, the following catalog of elements and steps is provided:

Elements

- 10 Analyzer
- 12 Batteries
- 14 Wall Transformer
- 15 Power Supply
- 16 Old Plug Connector
- 18 New Plug Connector
- 20 Old Receptacle
- 22 New receptacle
- 24 Old Ribbon
- 26 Old Pair Selector Board
- 28 New Ribbon
- 30 New Pair Selector Board
- 32 Routing Board
- 34 Old Buss
- 36 New Buss
- 38 Bridge Board
- 40 Central Processing Unit (CPU)
- 42 Data Buss
- 43 Volt Meter
- 44 Port Buss
- 45 Ohmmeter
- 46 Analog-Digital Converter
- 47 Capacitance Meter
- 48 Key Pad
- 50 Display Driver
- 52 Pin Ribbon
- 54 Front Panel Control
- 55 Wires
- 56 Old Pair Selector Dial
- 58 New Pair Selector Dial
- 60 Reset Membrane Switch
- 62 Visual Display Board
- 64 Printer
- 66 Generator
- 68 Probe Receptacle
- 70 Amplifier Circuit
- 72 Ground Lug
- 74 On/Off Switch
- 76 Volume Control
- 80 Talk Lugs
- 82 Talk and Data Receptacle
- 84 Battery Charge Receptacle
- 86 Cord Storage Pocket
- 88 TCX Receptacle

Steps

- 100 V:RG
- 102 PRINT
- 104 V:TG
- 106 PRINT
- 108 PRINT
- 110 R:TG
- 112 PRINT
- 114 V:RG
- 116 PRINT
- 118 V:TG
- 120 PRINT
- 122 R:RG
- 124 PRINT
- 126 R:TG
- 128 PRINT
- 130 R:RT
- 132 PRINT
- 134 C:RG
- 136 C:TG
- 138 PRINT
- 140 C:RG

I claim as my invention:

1. A telephone cable analyzer comprising:
    a. at least one plug connector whereby a plurality of telephone wires in pairs may be attached by the plug to the analyzer,
    b. a routing circuit,
    c. at least one pair selector interconnecting the plug and routing circuit,
    d. said pair selector including means for attaching any pair of wires to the routing circuit,
    e. a converter connected to the routing circuit,
    f. said converter including means for converting analog signals to binary digital signals,
    g. said routing circuit including means for routing a pair of wires to said converter, and
    h. a central processing unit connected to the pair selector, routing circuit, and converter,
    i. said central processing unit including means for controlling the pair selector, the routing circuit, and converter, and
    j. said central processing unit including means for analyzing, storing, and transmitting data from the converter, routing circuit, and pair selector.

2. The invention as defined in claim 1 including all of the limitations a. through j. wherein:
    k. said converter also includes:
        i. a volt meter for determining instantaneous voltage,
        ii. an ohmmeter for determining resistance, and
        iii. a capacitance meter for determining capacitance; and
    l. said routing circuit specifically forming means for routing either or both of a pair of wires to either:
        i. the volt meter, or
        ii. the ohmmeter, or
        iii. the capacitance meter,
    whereby a test may be made between the wires of a pair or between either wire and ground.

3. The invention as defined in claim 1 including all of the limitations a. through j. further comprising:
    k. a printer connected to the central processing unit, and
    l. the central processing unit forming means for controlling the printer to print results of interpretation of the digital signals from the converter.

4. The invention as defined in claim 1 including all of the limitations a. through j. further comprising:
    k. means for transmitting data from the central processing unit to remote locations in RS232C format, and
    l. means for receiving instruction in RS232C format from remote locations and controlling the central processing unit therewith.

5. The invention as defined in claim 1 including all of the limitations a. through j. wherein:
    k. there being two plug connectors and a pair selector for each plug.

6. The invention as defined in claim 5 including all of the limitations a. through k. further comprising:
    l. a bridging board interconnecting the two pair selectors,
    m. the bridging board forming means for connecting at least one pair of wires from one of said plug connectors to at least one pair of wires from the other of said plug connectors, and n. the central processing unit forming means for controlling the bridging board.

7. The invention as defined in claim 6 including all of the limitations a. through n. further comprising:

o. each pair selector including at least 26 relays, and
p. the bridging board including at least 26 relays.

8. The invention as defined in claim 5 including all of the limitations a. through k. wherein:

l. said converter also includes:
   i. a volt meter for determining instantaneous voltage,
   ii. an ohmmeter for determining resistance, and
   iii. a capacitance meter for determining capacitance; and
m. said routing circuit specifically forming means for routing either or both of a pair of wires to either:
   i. the volt meter, or
   ii. the ohmmeter, or
   iii. the capacitance meter,
whereby a test may be made between the wires of a pair or between either wire and ground.

9. The invention as defined in claim 8 including all of the limitations a. through m. further comprising:

n. a printer connected to the central processing unit, and
o. the central processing unit including means for controlling the printer to print results of interpretation of the digital signals from the converter.

10. The invention as defined in claim 9 including all of the limitations a. through o. further comprising:

p. means for transmitting data from the central processing unit to remote locations in RS232C format, and
q. means for receiving instruction in RS232C format from remote locations and controlling the central processing unit therewith.

11. The process of analyzing a first telephone cable having a plurality of pairs of wire, one wire of each pair designated as ring and the other wire as tip, comprising:

a. connecting a plurality of pairs of wires from the cable by a plug connector to an analyzer, where each pair is identified by its position in the plug,
b. grounding the analyzer,
c. selecting an identified specific pair of wires,
d. routing said selected pair of wires to an analog to digital converter,
e. converting an analog signal related to said selected pair of wire to a binary digital signal, and
f. controlling the selection, the routing, and the converting by a central processing unit.

12. The invention as defined in claim 11 including all of the limitations a. through f. wherein there is a second cable and further comprising:

g. connecting plurality of pairs of wires from the second cable by a second plug connector to the analyzer where each pair is identified by its position in the plug, and
h. said pair selection set out above in step b. from either cable.

13. The invention as defined in claim 11 including all of the limitations a. through f. with the addition of the following limitations:

g. identifying the pair of wires selected, and
h. visually displaying the identification of the wire pair and an indication of the analog signal related to the pair.

14. The invention as defined in claim 11 including all of the limitations a. through f. further comprising:

g. repeatedly producing at the converter analog signals related to the instantaneous voltage measured between one of the following: the ring and tip, the ring and ground, and the tip and ground,
h. storing each of values represented by the converted signal at the central processing unit,
i. averaging the values at the central processing unit, and
j. displaying the pair identification of the selected pair, the specific test, the specific measurement point, and the averaged value.

15. The invention as defined in claim 11 including all of the limitations a. through f. further comprising:

g. identifying the pair of wires selected, and
h. transmitting the binary digital signal with the wire pair identification to a remote location.

16. The invention as defined in claim 15 including all of the limitations a. through h. further comprising:

i. controlling said central processing unit from said remote location.

17. The invention as defined in claim 16 including all of the limitations a. through i. wherein there is a second cable and further comprising:

j. connecting a plurality of pairs of wires from the second cable by a second plug connector to the analyzer, where each pair is identified by its position in the plug, and
k. said pair selection set out above in step c. from either cable.

18. The invention as defined in claim 17 including all of the limitations a. through k. with the addition of the following limitations:

l. identifying the pair of wires selected, and
m. visually displaying the identification of the wire pair and an indication of the analog signal related to the pair.

19. The invention as defined in claim 18 including all of the limitations a. through m. further comprising:

n. repeatedly producing at the converter analog signals related to one of the following:
   i. instantaneous voltage
   ii. resistance and capacitance,
   iii. measured between one of the following:
      (a) the ring and tip,
      (b) the ring and ground, and
      (c) the tip and ground,
o. storing each of values represented by the converted signal at the central processing unit,
p. averaging the values at the central processing unit, and
q. displaying the pair identification of the selected pair, the the specific test, the specific measurement point, and the averaged value.

* * * * *